US009577710B2

(12) United States Patent
Greuet et al.

(10) Patent No.: US 9,577,710 B2
(45) Date of Patent: Feb. 21, 2017

(54) ENGAGING TERMINAL DEVICES

(75) Inventors: Jean-Baptiste Greuet, Ulm (DE);
Koray Ozcan, Farnborough (GB)

(73) Assignee: Nokia Technologies Oy, Espoo (FI)

( * ) Notice: Subject to any disclaimer, the term of this patent is extended or adjusted under 35 U.S.C. 154(b) by 970 days.

(21) Appl. No.: 13/517,832

(22) Filed: Jun. 14, 2012

(65) Prior Publication Data
US 2013/0223631 A1    Aug. 29, 2013

Related U.S. Application Data

(60) Provisional application No. 61/604,906, filed on Feb. 29, 2012.

(51) Int. Cl.
*H04B 5/00*  (2006.01)
*H04R 1/40*  (2006.01)
(Continued)

(52) U.S. Cl.
CPC .......... *H04B 5/0006* (2013.01); *H04B 5/0075* (2013.01); *H04R 1/403* (2013.01); *H04R 3/12* (2013.01); *H04R 5/04* (2013.01); *H04M 1/72558* (2013.01); *H04M 2250/04* (2013.01); *H04R 25/554* (2013.01); *H04R 2203/12* (2013.01); *H04R 2205/021* (2013.01);
(Continued)

(58) Field of Classification Search
USPC ...................... 381/17, 79, 74, 315, 312, 430
See application file for complete search history.

(56) References Cited

U.S. PATENT DOCUMENTS 5,793,875 A * 8/1998 Lehr .................... H04R 25/554
                                                                381/313
7,397,926 B1    7/2008 Frerking
(Continued)

FOREIGN PATENT DOCUMENTS

CN        201854433 U      6/2011
CN        102780956 A     11/2012
(Continued)

OTHER PUBLICATIONS

"BOOST—Near Field Audio Speaker Now Available! | iPhone in Canada Blog—Canada's #1 iPhone Resource"; Retrieved from the Internet on Jul. 11, 2013 at <URL: http://www.iphoneincanada.ca/accessories/boost-near-field-audio-speaker-now-available/>; whole document (5 pages).
(Continued)

*Primary Examiner* — Duc Nguyen
*Assistant Examiner* — Yogeshkumar Patel
(74) *Attorney, Agent, or Firm* — Harrington & Smith

(57) ABSTRACT

A method including producing a first audio output from a first device; and producing an electromagnetic field from a coil of the first device. The electromagnetic field includes information for at least partially producing a second audio output from a second device. The information is configured to provide a relationship between the first and second audio outputs such that when the first audio output is a first acoustic sound, for the first acoustic sound to be configured to acoustically couple with second acoustic sound from the second device which based upon the second audio output, or when the first audio output is not acoustic sound, for the first audio output to be output from the first device for a headset of at least one first user.

22 Claims, 11 Drawing Sheets

(51) Int. Cl.
*H04R 5/04* (2006.01)
*H04R 3/12* (2006.01)
*H04R 25/00* (2006.01)
*H04M 1/725* (2006.01)

(52) U.S. Cl.
CPC .... *H04R 2205/024* (2013.01); *H04R 2420/03* (2013.01); *H04R 2420/05* (2013.01); *H04R 2420/07* (2013.01); *H04R 2499/11* (2013.01)

(56) References Cited

U.S. PATENT DOCUMENTS

| | | | |
|---|---|---|---|
| 7,418,106 B2 | 8/2008 | Greuet et al. | 381/331 |
| 7,983,614 B2 | 7/2011 | Dunko et al. | 455/41.1 |
| 2003/0023331 A1 | 1/2003 | Komura et al. | 700/94 |
| 2004/0154461 A1* | 8/2004 | Havukainen | G10H 1/0066 |
| | | | 84/645 |
| 2004/0202339 A1* | 10/2004 | O'Brien, Jr. | H04B 13/005 |
| | | | 381/312 |
| 2005/0190928 A1 | 9/2005 | Noto | 381/77 |
| 2005/0244022 A1 | 11/2005 | Muthuswamy et al. | 381/315 |
| 2006/0013423 A1* | 1/2006 | Wieczorek | H04M 1/72591 |
| | | | 381/315 |
| 2006/0133633 A1 | 6/2006 | Hyvonen et al. | 381/315 |
| 2007/0087686 A1 | 4/2007 | Holm et al. | 455/3.06 |
| 2007/0149261 A1 | 6/2007 | Huddart | 455/575.2 |
| 2009/0036772 A1* | 2/2009 | Lu | 600/437 |
| 2009/0227282 A1* | 9/2009 | Miyabayashi | H04L 63/0492 |
| | | | 455/552.1 |
| 2009/0310790 A1 | 12/2009 | Sinton et al. | 381/2 |
| 2010/0136905 A1* | 6/2010 | Kristiansen | H04B 5/0075 |
| | | | 455/41.1 |
| 2011/0058677 A1 | 3/2011 | Choi et al. | |
| 2011/0059696 A1* | 3/2011 | Rasmussen et al. | 455/41.1 |
| 2012/0021682 A1 | 1/2012 | Tabaaloute | |
| 2012/0163620 A1 | 6/2012 | Zhang | 381/79 |
| 2013/0034234 A1* | 2/2013 | Chen | H04M 1/72591 |
| | | | 381/58 |
| 2013/0052947 A1 | 2/2013 | Kole et al. | 455/41.1 |
| 2013/0094680 A1* | 4/2013 | Allen | H04R 1/1041 |
| | | | 381/190 |
| 2013/0127404 A1 | 5/2013 | Maenpaa | 320/108 |

FOREIGN PATENT DOCUMENTS

| | | |
|---|---|---|
| EP | 2582153 A1 | 4/2013 |
| GB | 2483308 A | 3/2012 |
| WO | WO-98/52295 A1 | 11/1998 |
| WO | WO-2011/095841 A2 | 8/2011 |
| WO | WO-2013/078916 A1 | 6/2013 |

OTHER PUBLICATIONS

"Double Twist's latest trick is NFC-based MP3 sharing between Androids", Richard Lawler, May 10, 2011, 4 pgs.
"inStereo—Wireless iPhone, iPad, iPod stereo speaker system", http://instereo.com.au/ , Oct. 7, 2011, 3 pgs.
"Wireless Multi-Room Audio/Sony/Sony Store USA", Oct. 7, 2011, 3 pgs.
Sony Store USA/Sony VAIO® Computer/Sony Consumer Electronics, Jun. 6, 2012, 2 pgs.
"inStereo—Life's better inStereo!", Jun. 6, 2012, 2 pgs.

* cited by examiner

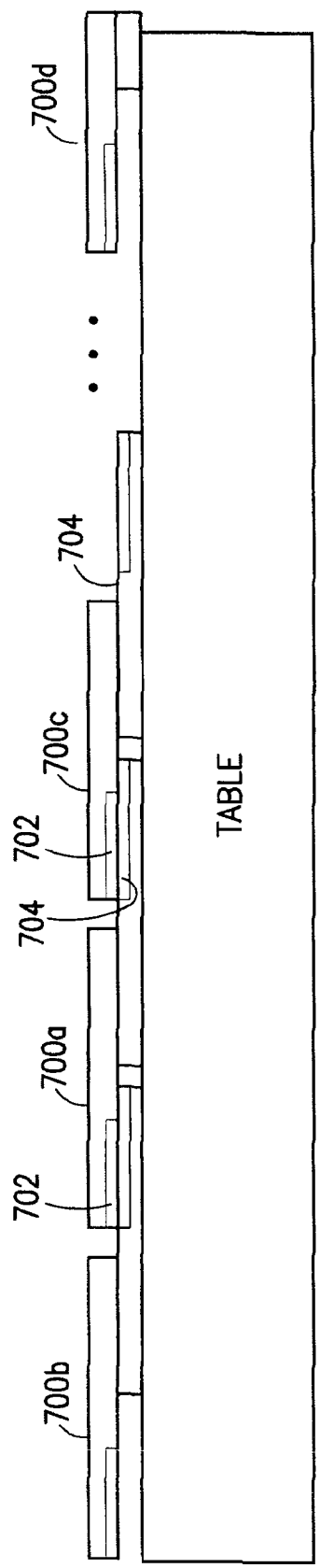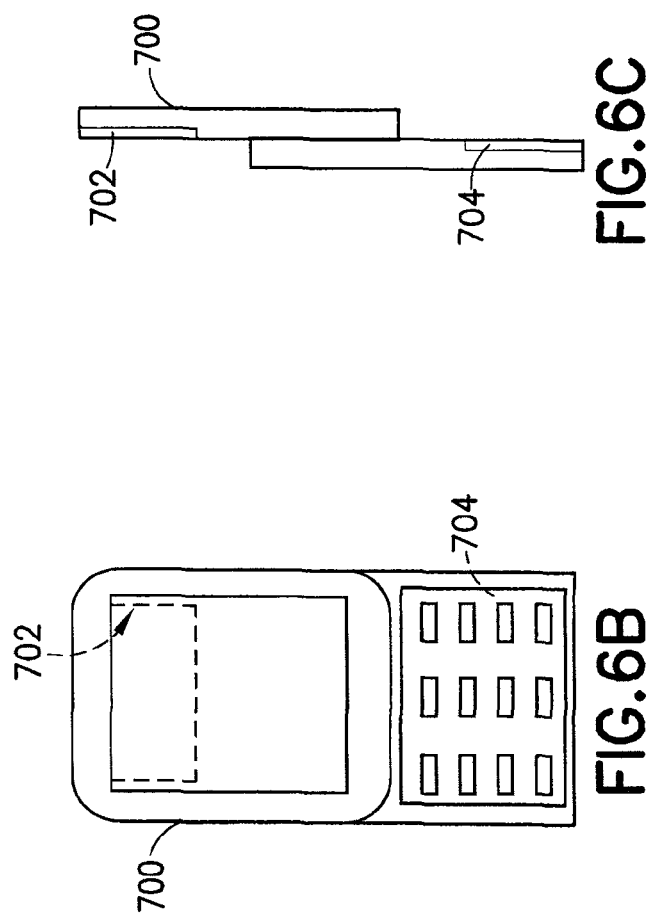

ENGAGING TERMINAL DEVICES

CROSS REFERENCE TO RELATED APPLICATION

This application claims priority on U.S. Provisional Patent Application No. 61/604,906 filed Feb. 29, 2012, which is hereby incorporated by reference in its entirety.

BACKGROUND

Technical Field

The exemplary and non-limiting embodiments relate generally to inductively coupled systems, methods, devices and computer programs and, more specifically, relate to using inductive coupling to improve quality and loudness of audio output of inductively coupled devices.

Brief Description of Prior Developments

Portable devices, such as mobile phones for example, provide various functionalities; through which many use cases may be provided to an end user. For example, playing a music file or FM radio where the audio files could be reproduced using an integrated hands-free sound generation or alternatively (and privately) using a headset connection. The end user may store and play these audio files whenever desired. The end user is also able to share/transfer these files between portable devices (such as a personal computer, a mobile phone, etc.) using well-known solutions such as a Bluetooth (BT) connection, multimedia messaging, a wired connection, swapping memory card, emails, etc.

Many portable devices include internal hands-free speakers. The loudness of hands-free speakers may be important; especially in areas where the noise levels are high (e.g., urban areas, etc.). Various approaches attempt to improve playback characteristics, for example, use of signal processing and integration of larger transducers, external accessories with passive amplification, etc. Small speaker components have limitations, such as perceived inadequate loudness for example. Buying and carrying an external accessory just for improving loudness is clearly not a desire for most users.

SUMMARY

The following summary is merely intended to be exemplary. The summary is not intended to limit the scope of the claims.

In accordance with one aspect, a method includes producing a first audio output from a first device; and producing an electromagnetic field from a coil of the first device. The electromagnetic field includes information for at least partially producing a second audio output from a second device. The information is configured to provide a relationship between the first and second audio outputs such that when the first audio output is a first acoustic sound, for the first acoustic sound to be configured to acoustically couple with second acoustic sound from the second device which is based upon the second audio output, or when the first audio output is not acoustic sound, for the first audio output to be output from the first device for a headset of at least one first user.

In accordance with another aspect, an apparatus comprises a system for generating a first audio output; a coil configured to send information by inductive coupling from the apparatus by an electromagnetic field, where the information relates to the first audio output; and a controller connected to the system for generating the audio output and connected to the coil. The apparatus is configured such that when the first audio output is acoustic sound, the acoustic sound is generated with a time delay relative to sending of the information from the coil to allow the acoustic sound to acoustically couple with acoustic sound from at least one second device, where the acoustic sound from the at least one second device is generation dependent upon the information from the coil. The apparatus is configured such that when the first audio output is not acoustic sound, for the first audio output to be output from the first device for a headset of at least one first user.

In accordance with another aspect, a method comprises producing acoustic sound from a first device based, at least partially, upon an audio signal; producing an induction electromagnetic field from a coil of the first device, where the induction electromagnetic field comprises information relating to the audio signal; and buffering the audio signal in the first device before producing the acoustic sound to at least partially allow coordination between the producing of the acoustic sound and acoustic sound from at least one second device which is at least partially dependent upon the information from the coil.

In accordance with another aspect, a non-transitory program storage device readable by a machine, tangibly embodying a program of instructions executable by the machine for performing operations, is provided where the operations comprise producing an audio signal in a first device; producing an induction electromagnetic field from a coil of the first device, where the induction electromagnetic field comprises information relating to the audio signal; and either outputting the audio signal to a transducer of a headset connected to the first device, or buffering the audio signal in the first device for a predetermined period of time before sending the audio output signal to a speaker of the first device to produce acoustic sound.

BRIEF DESCRIPTION OF THE DRAWINGS

The foregoing aspects and other features are explained in the following description, taken in connection with the accompanying drawings, where:

FIG. 6A demonstrates another induction coupling with mobile devices, such as slide phones in accordance with various exemplary embodiments.

FIG. 6B is a front view of one of the slide phones shown in FIG. 6A.

FIG. 6C is a side view of the slide phone shown in FIG. 6B.

DETAILED DESCRIPTION OF EMBODIMENTS

Figure 1:
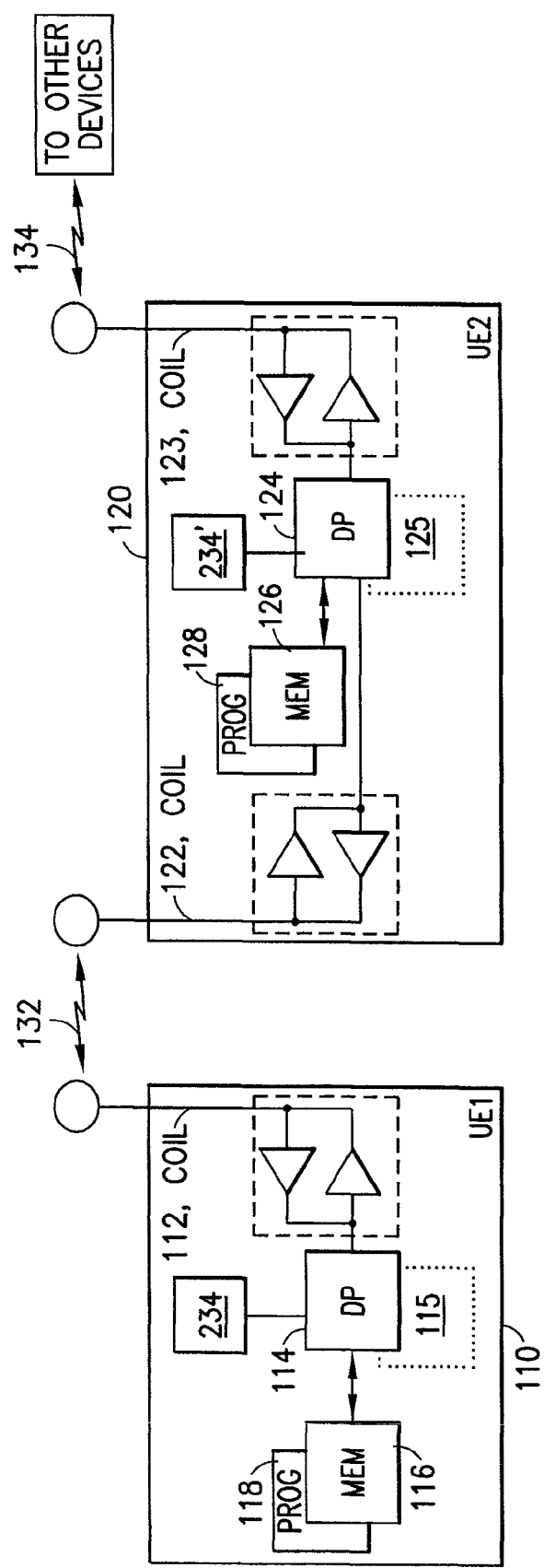
FIG. 1 shows a simplified block diagram of exemplary electronic devices that are suitable for use in practicing various exemplary embodiments.

Reference is made to FIG. 1 for illustrating a simplified block diagram of electronic devices or apparatus that are suitable for use in practicing exemplary embodiments. FIG. 1 shows a first apparatus 110 and a second apparatus 120 connected as paired devices 130. In the paired devices 130 of FIG. 1, the first apparatus, may be referred to as a User Equipment 1 (UE1) 110, and the second apparatus may be referred to as a User Equipment 2 (UE2) 120. In this example, the UE1 110 and UE2 120 may be inductively coupled to one another as indicated by 132.

The UE1 110 includes a controller, such as a computer or a data processor (DP) 114, a computer-readable memory medium embodied as a memory (MEM) 116 that stores a program of computer instructions (PROG) 118, and a suitable wireless interface, such as an inductive coil 112, for wireless communications with the UE2 120 over a wireless link 132. The wireless communication link 132 may be bidirectional.

The UE2 120 also includes a controller, such as a computer or a data processor (DP) 124, a computer-readable memory medium embodied as a memory (MEM) 126 that stores a program of computer instructions (PROG) 128, and a suitable wireless interface, such as an inductive coil 122, for communication with the UE1 110. The UE2 120 may also include a second suitable wireless interface, such as an inductive coil 123, for communication with another device over another wireless link 134.

At least one of the PROGs 118 and 128 is assumed to include program instructions that, when executed by the associated DP, enable the device to operate in accordance with exemplary embodiments, as will be discussed below in greater detail. That is, various exemplary embodiments may be implemented at least in part by computer software executable by the DP 114 of the UE1 110; and/or by the DP 124 of the UE2 120, or by hardware, or by a combination of software and hardware (and firmware). The UE1 110 and the UE2 120 may also include dedicated processors, for example audio processor 115 and audio processor 125.

In general, the various embodiments of the UE1 110 and/or the UE2 120 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 116 and 126 may be of any type suitable to the local technical environment and may be implemented using any suitable data storage technology, such as semiconductor based memory devices, flash memory, magnetic memory devices and systems, optical memory devices and systems, fixed memory and removable memory. The DPs 114 and 124 may be of any type suitable to the local technical environment, and may include one or more of general purpose computers, special purpose computers, microprocessors, digital signal processors (DSPs) and processors based on a multicore processor architecture, as non-limiting examples.

The wireless interfaces (e.g., inductive coils 112 and 122) may be of any type suitable to the local technical environment and may be implemented using any suitable communication technology such as a hearing aid compatibility (HAC) coil, a coil of a near field communications (NFC) antenna, a metal detector coil, a coil of an internal speaker, a coil specifically dedicated for acoustic coupling between acoustic outputs of two devices, etc. Using coils for different purposes is described in U.S. patent application No. 13/298, 709 filed Nov. 17, 2011 and U.S. patent publication No. 2006/0133633 A1 which are hereby incorporated by reference in their entireties. Certain embodiments of the UE 110, 120 may include one or more inductive coils (such as COIL 112, 122 and 123 as shown in FIG. 1) and/or one or more secondary radios such as a wireless local area network radio WLAN and a BLUETOOTH® radio, which may incorporate an antenna on-chip or be coupled to an off-chip antenna. The various programs 118 are stored in one or more memories.

The example embodiment of FIG. 1 provides a new use for a coil in a mobile device. For the example shown in FIG. 1, the two inductively paired devices 110, 120 may drive their two respective terminal speakers 234, 234' (e.g., the IHF speaker of each phone) substantially at a same time. Thus, acoustic sound from the speakers 234, 234' can acoustically couple.

For the example embodiment shown in FIG. 1, the overall acoustic output may be increased due to the sound generation from the two terminal devices. Acoustic radiation characteristics from each speaker 234, 234' may acoustically couple, such as when in close proximity. This close proximity is automatically provided because the close proximity is needed to provide inductive coupling between devices 110, 120. The acoustic coupling can improve loudness of sound from the multiple coupled devices 110, 120 versus loudness from only a single one of the devices 110, 120. However, the amount of improvement may also depend on other factors, such as the distance of two devices relative to each other, and the position of their speakers relative to the user, and the time delay between each speaker's output. If two terminal devices are producing/playing simultaneously and in phase, and each device comprises a single speaker component, then each speaker radiates the acoustic power, which is equivalent to (at low frequencies):

$$W = (\text{Diaphragm Velocity})^2 \times \text{Diaphragm Area} \times \text{Re}\{\text{Radiation Impedance}\}$$

The radiation impedance is also proportional to diaphragm area. Additionally, for illustration the two speakers may be treated as identical. Therefore, the above equation can be further simplified as:

$$W \sim (\text{Diaphragm Velocity})^2 \times (\text{Diaphragm Area})^2$$

For the example when two identical speakers are acoustically coupled, each speaker can move in phase with the same velocity. The speakers could move with the same velocity but out of phase. Therefore, the total radiating area will be doubled, and this provides an acoustic power increase.

Figure 2:
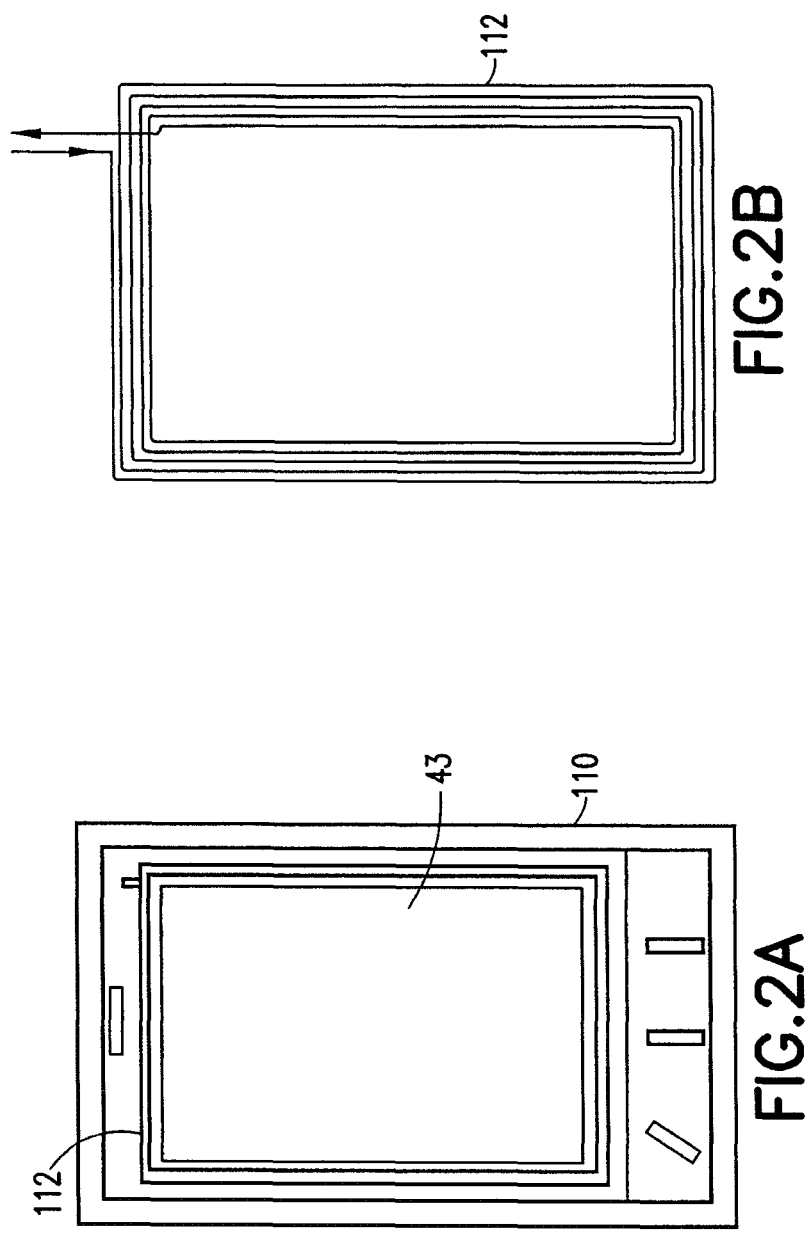
FIG. 2A shows a drawing of an exemplary mobile device suitable for use in practicing various exemplary embodiments.
FIG. 2B is an enlarged view of the coil shown in FIG. 2A.

FIG. 2A shows a front view of the exemplary mobile device 110. As shown in this example embodiment a printed coil 112 (shown in an enlarged view in FIG. 2B) is located in an area around a touch panel 43 (for example, on a circuit board or printed to the inside of the cover of the device). The printed coil 112 (or signal loop) in not required to be circular and may take additional shapes, for example, rectangular as shown.

Figure 3:
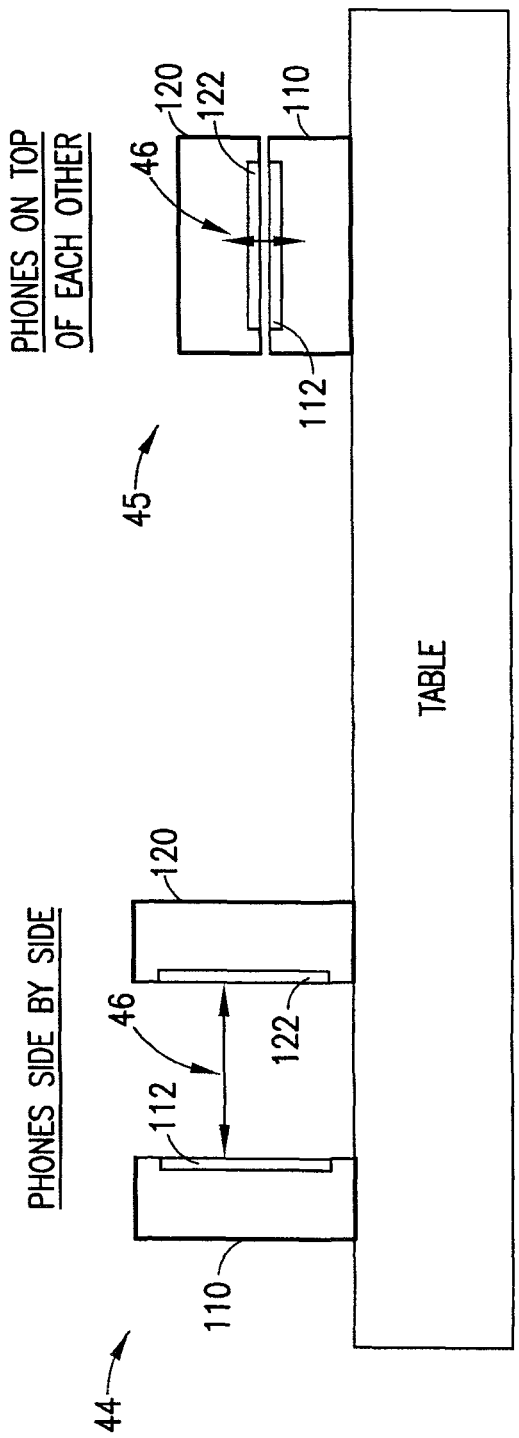
FIG. 3 demonstrates an induction coupling with two mobile devices in accordance with various exemplary embodiments.

FIG. 3 demonstrates an induction coupling with the two mobile devices 110, 120. The mobile devices 110, 120 may be placed so that their respective 112, 122 coils are close to each other to insure a good inductive coupling such as placed side-by-side as indicated by 44. Placed side-by-side, the mobile devices 110, 120 can achieve inductive coupling over a short distance. Alternatively, the mobile devices 110, 120 may be placed one on top of the other as indicated by 45 (either both in the same orientation (not shown) or in opposite orientations (face-to-face as shown). Both types of situations provide the inductive coupling 46 between their coils 112, 122.

Figure 4:
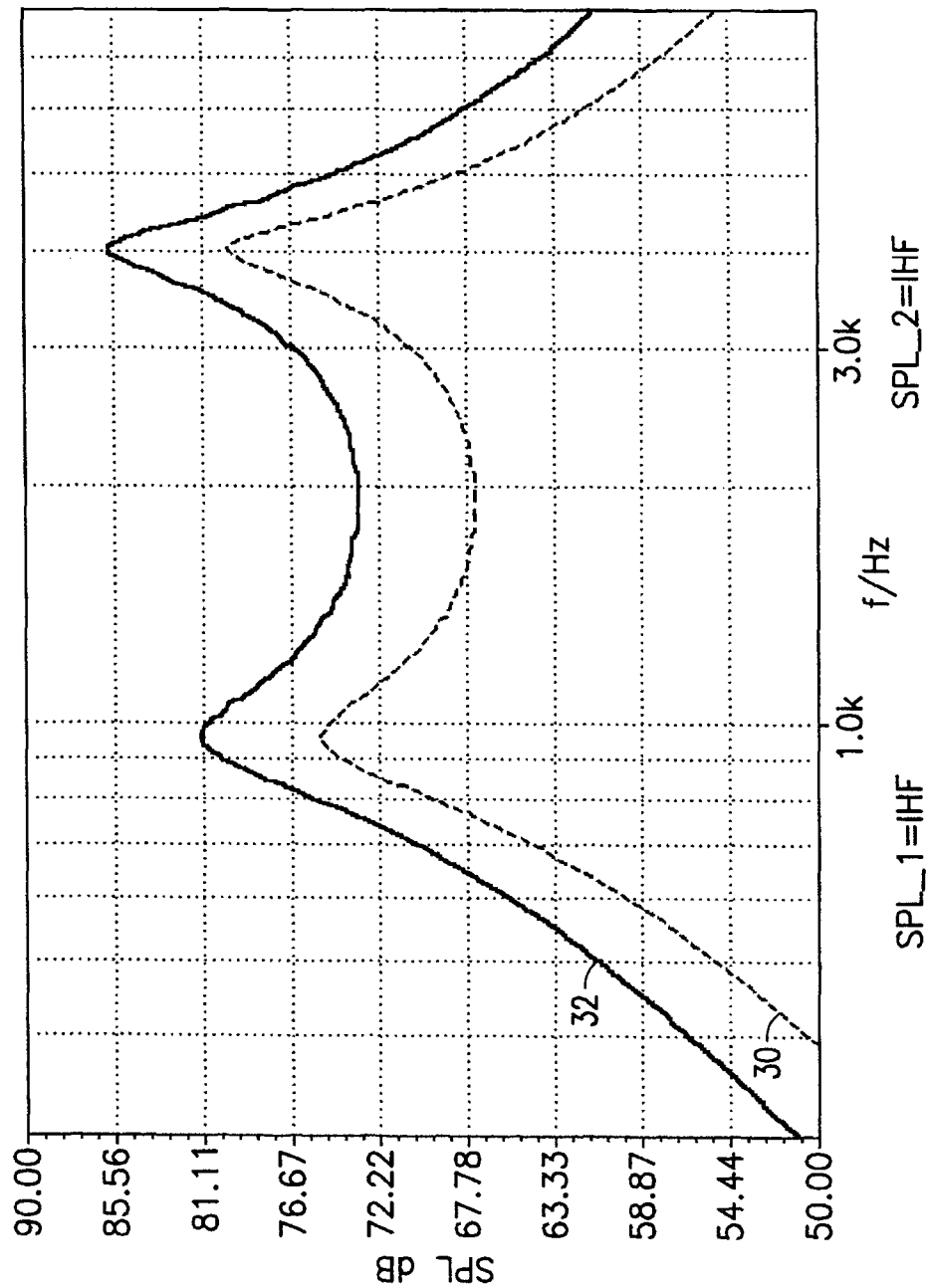
FIG. 4 illustrates acoustic frequency responses of both a one device system and a two device system.

FIG. 4 illustrates a frequency response simulation 30 from a speaker 234 of the first device 110 and a frequency response 32 with acoustic coupling from the speaker 234 of the first device and a speaker 234' of the second device 120. Comparing 30 to 32, this demonstrates that loudness may be increased when two speakers are acoustically coupled. For example, one may acoustically couple two sounds/speakers without getting 6 dB more loudness. FIG. 4 graphs the sound pressure level (SPL) for one IHF speaker 234 (1=IHF) and the SPL for two IHF speakers 234, 234' (2=IHF) operating in accordance with an exemplary embodiment. The SPL 32 for the two IHF speakers method is shown to be higher than the SPL 30 of the one IHF speaker method for the full range of frequencies. It should be noted that generally these results are simulation results, not necessarily measurements.

In view of psychoacoustics, delays of about 35-40 ms or more can create an audible echo between two sound sources. Even in a worst-case scenario, when two terminal devices are simultaneously playing, a delay between 10 ms to about 35 ms may be acceptable although a flanging effect is audible as the delays approaches about 35 ms. However, loudness is improved because a mono sound image is perceivable without causing any echo. Such time delay can cause a spatial effect wherein a sound source is localized as a mono signal, but its position seems to be coming from off central. Such effect is more obvious when heard over headphones, and less noticeable when heard over speakers.

When coordinating multiple devices, various exemplary embodiments may use inductive coupling in order to quickly relay information between/among the devices. The information can include, for example, information containing audio output from the first device, an audio file transfer, or any other suitable information to create acoustic coupling of sound from multiple devices or playing the same audio output from multiple devices. Accordingly, the timing delays between the audio output of the devices may be kept to a minimum. In contrast, relaying the audio data using other techniques, e.g., email, FTP, etc., may not provide a suitable transmission speed. This may then require additional synchronization requirements (e.g., the full data file may be required to be received prior to initiation of playback) and/or network resources (e.g., servers, routers, bandwidth, etc.). If desired, the effect of such delays can be neutralized psychoacoustically by other techniques, e.g., by applying interaural intensity difference; however, the localized image may be diffused. Thus, there may be a trade-off between such time delay and intensity difference.

Figure 5:
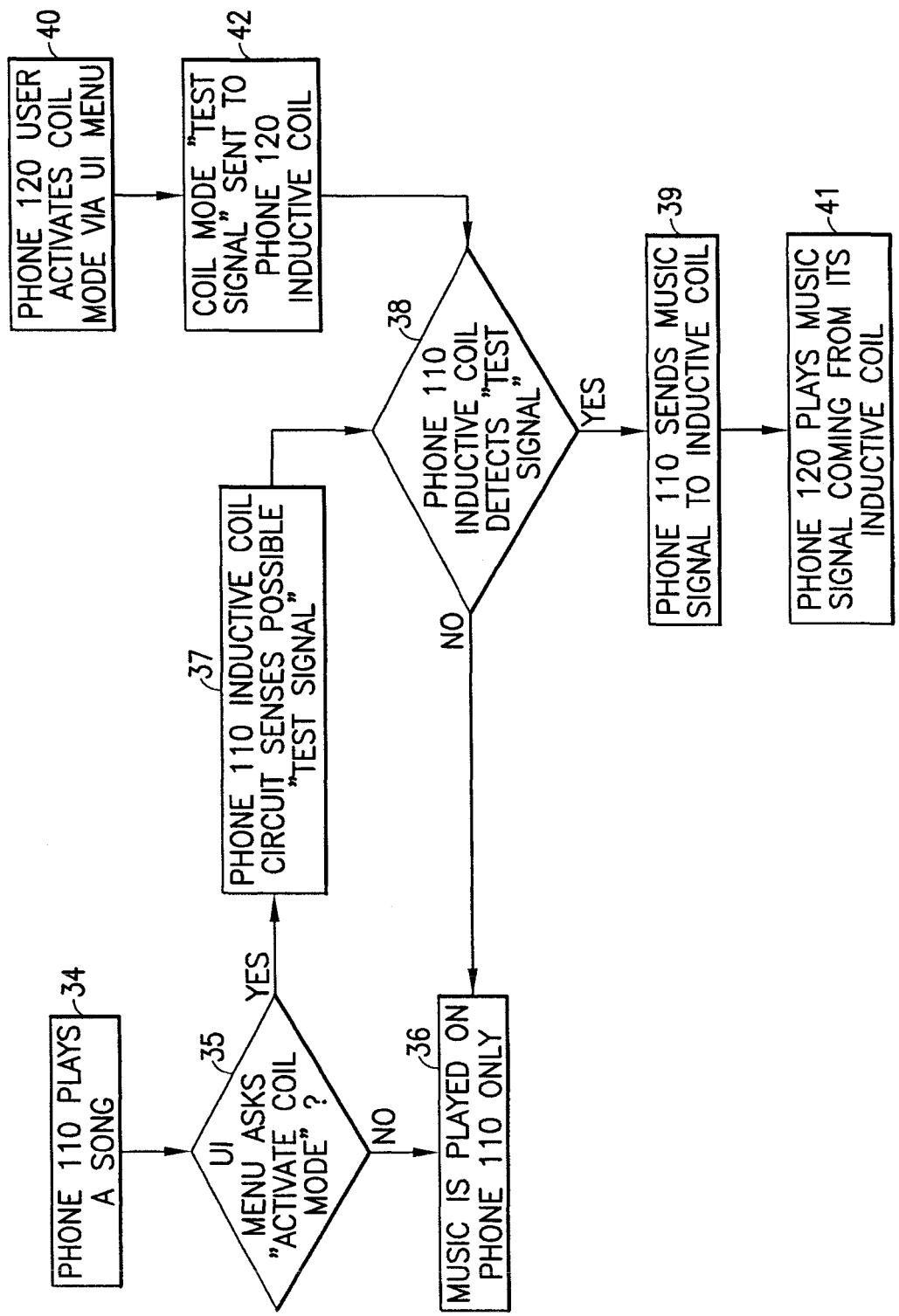
FIG. 5 is a logic flow diagram that illustrates the operation of an exemplary method, and a result of execution of computer program instructions embodied on a computer readable memory, in accordance with various exemplary embodiments.

In the example shown in FIG. 1, the two devices 110, 120 may be synchronized for playing audio by an application that maintains the delay time to be less than about 35 ms. FIG. 5 is a logic flow diagram that illustrates the operation of an exemplary method, and a result of execution of computer program instructions embodied on a computer readable memory, in accordance with various exemplary embodiments. When phone 110 plays a song as indicated by block 34, the UI menu may prompt the user to ask if the user wishes to use "Active coil mode" as indicated by block 35. If not, the music is played by phone 110 only as indicated by block 36. If the user does wish to use "Active coil mode", phone 110 checks for a "Test signal" as indicated by block 37 using the inductive coil circuitry. If phone 110 does not detect a "Test signal" (for example, if phones 110 and 120 are too far apart, or phone 120 has not be set-up for a coil mode), the music is played by phone 110 only as indicated by block 36. On phone 120, the user of phone 120 can activate "coil mode" using a UI on phone 120 as indicated by block 40. If a "Test signal" is sent from phone 120 as indicated by block 42 and is received as indicated by block 38, phone 110 then sends information to phone 120 using the inductive coil and inductive coupling as indicated by block 39. The inductive coupling provides a communication electromagnetic field from the coil of the first device, where the communication electromagnetic field comprises the information for at least partially producing a second audio output from the second device. In the multiple speaker example noted above, the information is configured to provide a relationship between the first and second audio outputs. This could be, for example, to merely play the same music at substantially the same time. As seen above, once phone 110 detects the signal, phone 120 can start receiving the music signal using its inductive coil. This music signal can then be played (e.g., using a IHF speaker) as indicated by block 41. A test signal may be played by phone 120 (and recorded by phone 110) in order to calibrate the time delay between acoustic output of phone 110 and acoustic output of phone 120.

Phone 120 may also perform signal processing in order to improve the quality of the signal. For example, if the information received by phone 120 from the inductive coupling is an audio signal, the signal may be amplified by the phone 120. This amplification may use a threshold level to determine whether or not to amplify the signal. If the signal is sufficiently strong (e.g., a high threshold is exceeded) no amplification may be needed. Alternatively, if the signal is too weak (e.g., below a low threshold) amplification may be deemed as insufficient and the transmission is considered to have failed.

Phone 110 may also apply signal processing in order to improve the transfer of information. For example, phone 110 may modulate the signal sent in the inductive coupling to increase the rate of transfer and/or to provide error checking/correction. Phone 120 may then perform signal processing to convert the signal for audio output production, for example, by demodulating the received signal.

In this non-limiting example, phone 110 and phone 120 are paired. Phone 110 acts as a master and phone 120 is the slave. Additional actions may also be taken during the described process. For example, phone 110 and phone 120 may establish parameters (e.g., a timing delay between phone 110 and phone 120, etc.) for music playing once the "Test signal" is received and prior to transmission of the music signal. For example, in one example situation it may take 50 ms for the information sent through the inductive coupling from phone 110 to be used to generate acoustic sound from phone 120. Thus, the audio signal used to produce the acoustic output from phone 110 may be buffered to delay output of the acoustic sound from phone 110 about 50 ms. The buffering may not be necessary in some circumstances and, thus, may be considered as optional. Buffering may coordinate or otherwise provide a timing relationship between the acoustic outputs of the two devices to play at about the same time and provide acoustic coupling. These parameters may establish various configurations for the music playing, for example, to provide 3D effects, directionality, etc. Phone 110 and phone 120 may also perform a handshake when pairing (for example, in response to phone 110 detecting the "Test signal". The handshake enables phone 110 and phone 120 to convey information (e.g., identifiers, configuration settings, etc.) as well as to determine various parameters.

During the handshake both phone 110 and phone 120 may transmit and receive using the inductive coupling. Once the handshake has been completed, phone 110 and phone 120 may transition to a more role specific mode. For example, phone 120 may generally use the inductive coupling to receive signals from phone 110. Alternatively, phone 120 may be limited in regards to allowed transmissions on the inductive coupling (e.g., a heartbeat signal, error messages, updated parameters, notices regarding subsequent devices, etc.).

Phone 110 and phone 120 may use further elements in order to determine relevant parameters. For example, phone 110 may instruct phone 120 to produce a 'test sound' using the speaker of phone 120. Phone 110 may then use a microphone (or its own microphone) to detect the 'test sound'. Based on the 'test sound' phone 110 may be able to determine the time delay between sending information from the coil of phone 110 and the acoustic sound being produced by the speaker of phone 120. As a "fine tuning" step, phone 110 and 120 might play the same simple test signal over both of their speakers 234, 234', and the microphone of Phone 110 may "listen" to both superposed sounds; checking whether the sounds are Ok or not.

With features of the example embodiments described herein, methods and systems may be provided for enabling audio sharing (e.g., music playback, speech, FM radio, etc.) and a listening experience with at least two terminal devices, such as two mobile phones for example. The audio of at least two terminal devices may be coordinated in real time in a simple and cost effective approach. For example, the audio may be substantially synchronized, to produce audio effects, etc. The two terminal devices may be inductively coupled in order to share and listen to audio files for example. Additionally, hands-free speakers in both terminal devices may be used to improve the audio quality of the audio output. For example, perceived loudness may be increased by providing a directional audio effect and/or providing 3D audio effect such as a stereo widening effect. One advantage of various exemplary embodiments is that it provides new mechanisms in which inductive coils are utilized. These mechanisms may include options in order to transmit audio files. This may be provided using a new application in order to access the coils and transmit audio files through inductive coupling.

In one different example, the UE1 110 and/or the UE2 120 may be inductively coupled to at least one other device. FIG. 6A demonstrates another induction coupling with mobile devices 700, such as slide phones in accordance with various exemplary embodiments. FIGS. 6B and 6C show an example slide phone 700. The mobile devices 700 may include more than one coil, for example, both a HAC coil 702 and a coil 704 of a NFC antenna. The coils 702, 704 of each device 700 are used for inductive coupling with the coils 702, 704 of at least one other device 700. As shown, the mobile devices 700 are slide phones. The two coils 702, 704 of a first device 700a are positioned such that a slide phone can be connected to two other devices 700b, 700c. As shown, a HAC coil 702 is located near the top of the phone 700a and the coil 704 of the NFC antenna is located at the bottom. The coils may be positioned so that the phones can be stacked so that the HAC coil 702 of one device can be positioned adjacent to the coil 704 of the NFC antenna of another device while leaving its own NFC coil available for another device.

Additionally, one coil (e.g., a coil of the NFC antenna) may produce signals in two directions. Therefore, more than one second device may be coupled to a single coil of the first device. For example, two devices may be positioned around a transmitting coil of a NFC antenna of the first device such that a HAC coil of each second device receives a signal from the coil of the NFC antenna of the first device.

An another alternative, a first phone may be paired to a second phone such that the second phone is the slave, and the second phone may pair to a subsequent third phone. The second phone may act as a master for the third phone while still acting as a slave to the first phone. Any useful data (e.g., signal time delay between the second phone and the third phone) may be transferred to the first phone from the second phone. The data may also be stored in the second phone. Transmitting the data to the first phone allows the first phone to take the data into account while playing and/or transmitting information to the second phone, for example, by factoring in any signal time delays between the first phone and the second phone, and/or between the second phone and the third phone, in order to ensure the audio output of all inductively coupled phones is sufficiently synchronized or otherwise coordinated. Likewise, additional phones may be added such that the first phone may have access to data regarding all phones connected to it either directly (e.g., such as the connection with the second phone) or indirectly via one or more intermediary phones.

Furthermore, as illustrated from the example shown in FIG. 6A, the first phone may include more than one coil to be used in information transmission and/or reception via inductive coupling. The additional coil(s) may then be used to connect to additional phones. For example, the first phone may act as a master to two slave phones; each slave phone using a different coil of the master phone.

As noted above with respect to a possible "fine tuning" step, if there are more than two phones, and if phone is the master of the other phone(s), the master phone may send a test signal alternatively to the other phones. The microphone of master phone may listen to the signals, and may recalibrate one or more of the delays if necessary.

Figure 7:
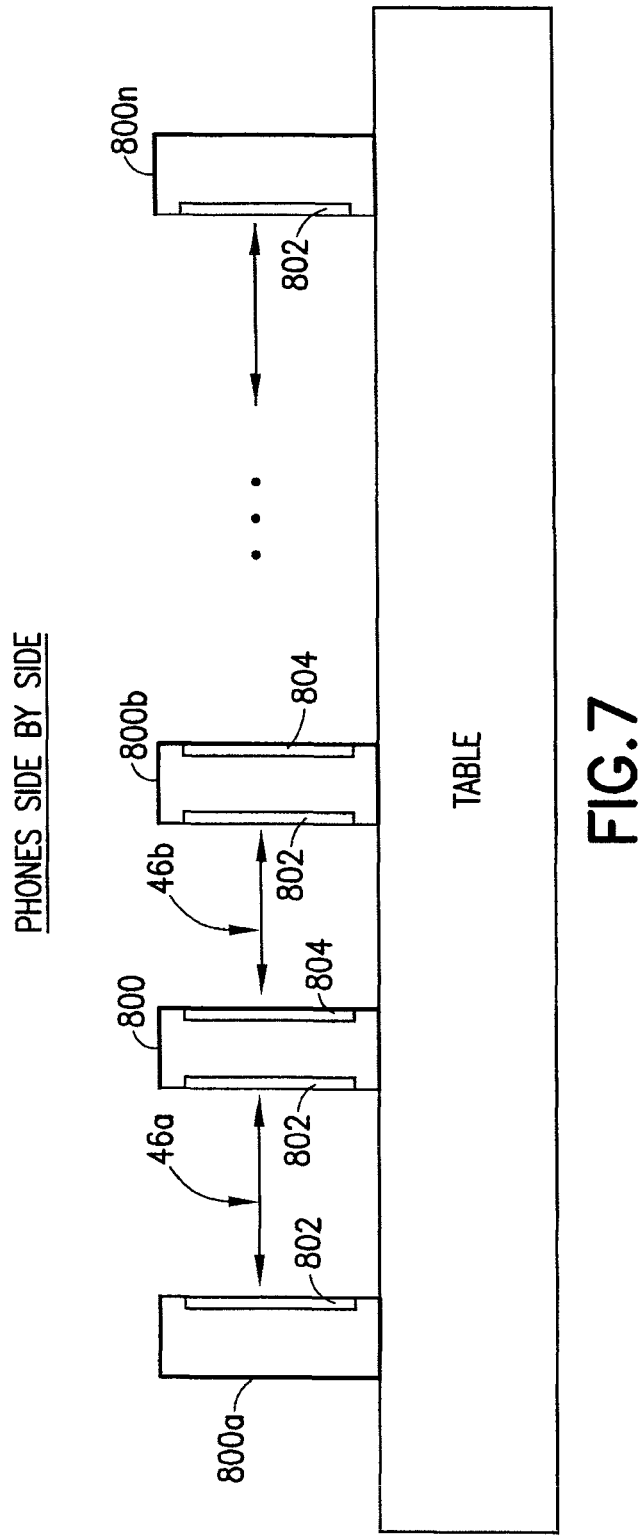
FIG. 7 demonstrates another induction coupling with more than two mobile devices in accordance with various exemplary embodiments.

FIG. 7 demonstrates another example of induction coupling with more than two devices. In this example device 800 has a first coil 802 placed proximate a front side of the phone (e.g., the HAC coil) and another coil 804 placed proximate the back of the phone (e.g., a metal detection coil). A second device 800a with a coil 802 is located in a generally side-by-side orientation with the first device 800 to establish the inductive coupling 46a with the coil 802 of the first device 800. A third device 800b with a coil 802 is located in a generally side-by-side orientation with the first device 800 to establish the inductive coupling 46b with the coil 804 of the first device 800. One or more additional devices 800$n^{th}$ could be added such that its/their coil(s) 802 couples with the coil 804 of the third device 800b or another intervening device. Thus, multiple devices can be connected in series and all of the speakers could be used to combine acoustic sound, such as increasing loudness for example.

In one example, the devices in FIGS. 6A or 7 may be configured to simultaneously play music, and at least one of the devices can transmit a signal to another one of the devices. The devices can also relay messages between devices to which they are coupled/paired.

Figure 8:
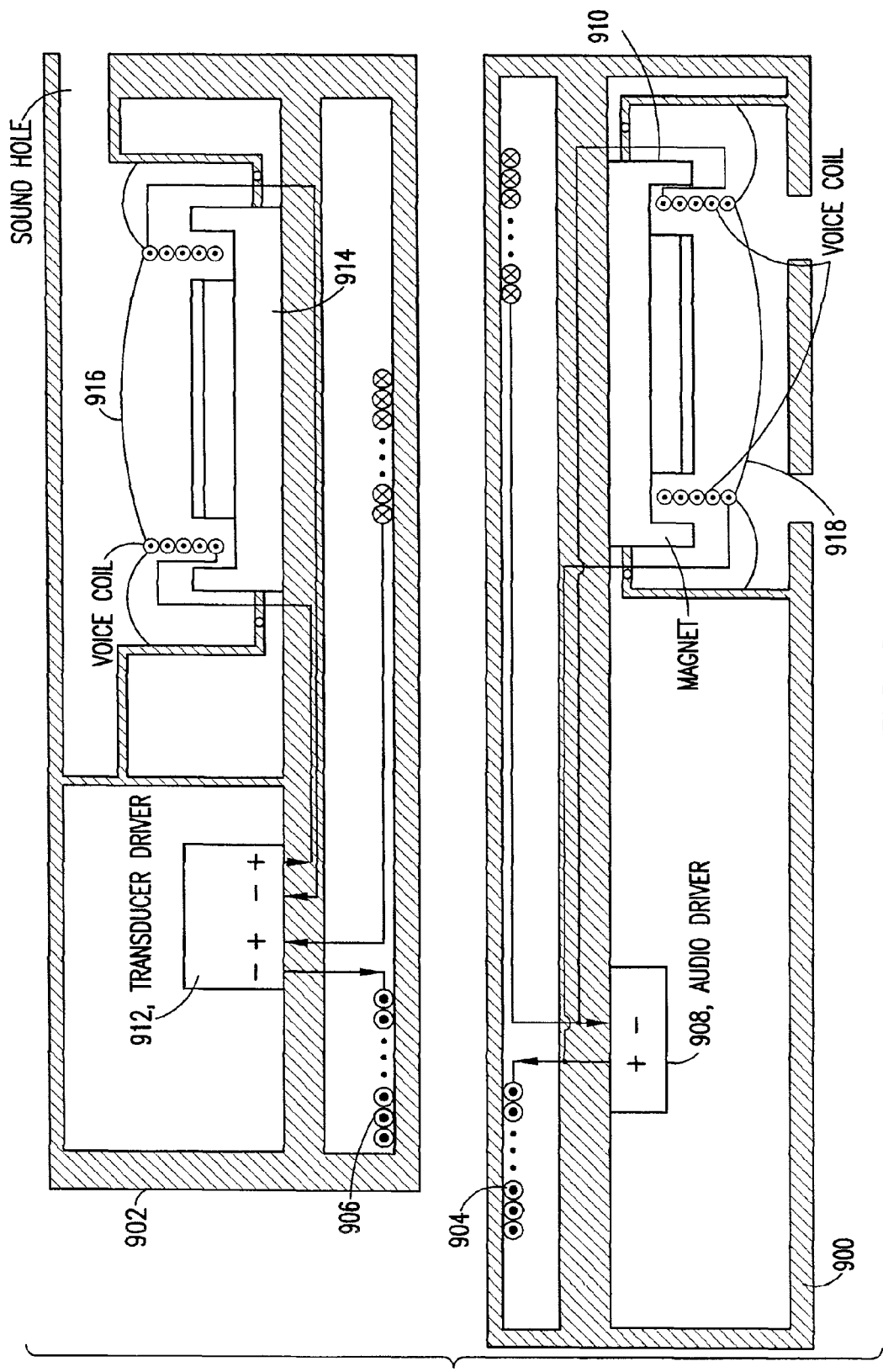
FIG. 8 shows a drawing of two exemplary mobile devices suitable for use in practicing various exemplary embodiments.

FIG. 8 shows a drawing of two exemplary mobile devices 900, 902 suitable for use in practicing various exemplary features. As shown, the emitting coil 904 of the first mobile device 900 is coupled to the reception coil 906 of the second mobile device 902. The audio driver 908 is connected to the emitting coil 904 and to the IHF speaker 910. A transducer driver 912 on the second mobile device 902 is connected to the reception coil 906. Data or information provided to the transducer driver 912 from the reception coil 906 can be applied to the IHF speaker 914 (e.g., to drive the IHF diaphragm 916). The coils 904, 906 and polarities may be arranged so that both speaker membranes 916, 918 move to provide an acoustic coupling, such as in phase to increase loudness for example.

As shown, both mobile devices 900, 902 include electrodynamic speakers 910, 914. The electrodynamic speakers each have a diaphragm, a voice coil and a magnet. The driver (e.g., an audio driver 908 or transducer driver 912) provides a signal to the voice coil which causes a signal to be generated in the voice coil. The interaction of the magnetic signal and the magnet moves the voice coil and, thus, the diaphragm. The movement of the diaphragm generates acoustic waves which can then be heard. Additionally, the signal generated in the voice coil may be detected by another inductive coil (not shown) in order to provide an inductive coupling.

Various exemplary embodiments may be used in many situations. For example, during a party when one user plays a file and other users gather their phones so that the phones all play together for a louder sound generation. Another example is a conference call where an IHF sound generation from a mobile phone can be used (if no desk phone is available). If the meeting room is big and many people are participating, an additional handset could couple to the first handset which could improve the sound characteristics.

Alternatively a coil of a NFC antenna may be utilized such as in a professional exhibition hall for example; when a user wants to get more information about a product. A device with a small speaker may attract the attention of the visitor. If the visitor wants to know more about the product, the visitor may place his phone near the device. The coil of the NFC antenna may allow the user to use the phone's IHF to listen to the information (or to make sound louder). For a private playback, the user may use his headphones instead.

Figure 9:
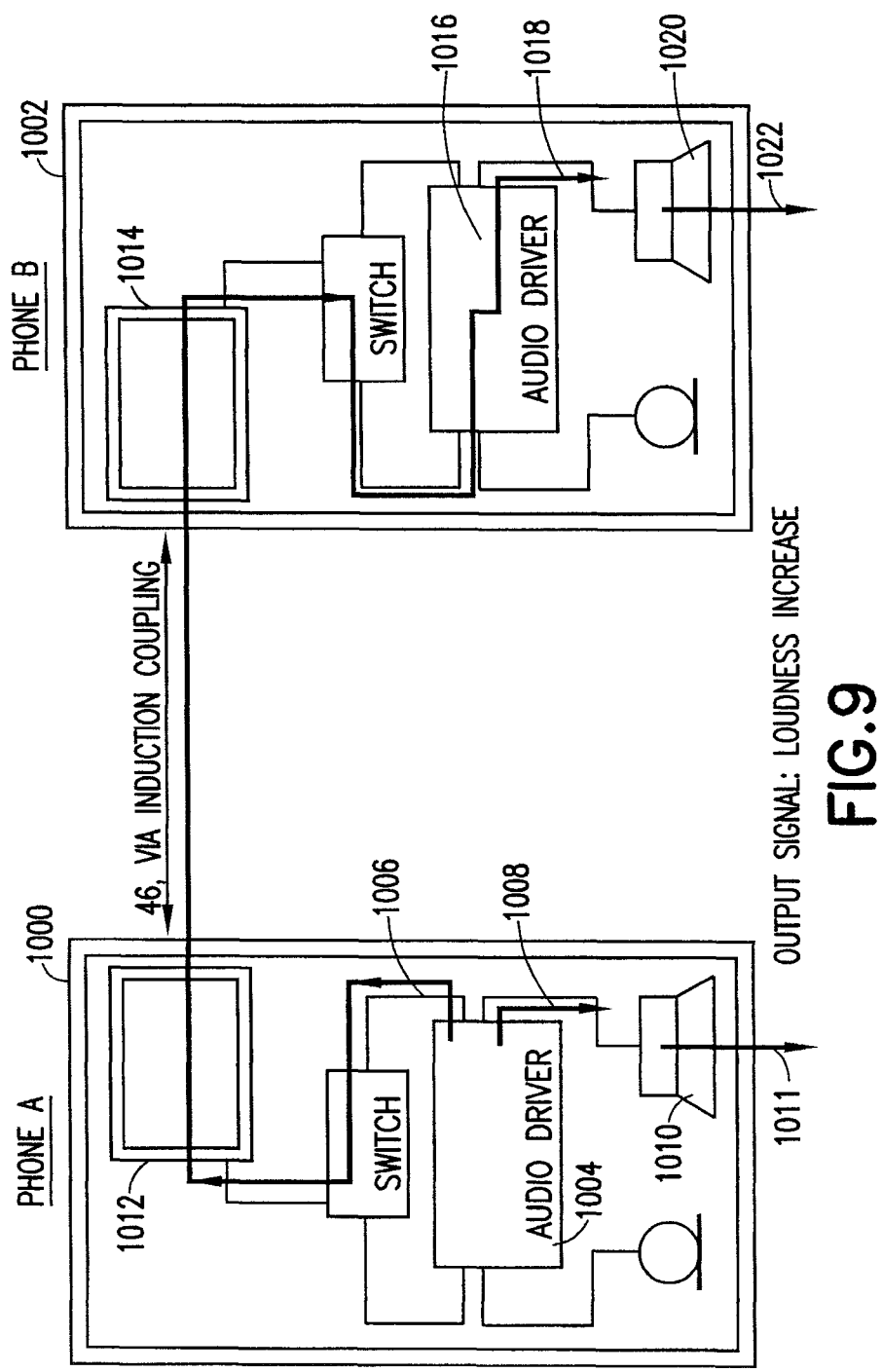
FIG. 9 shows another drawing of two exemplary mobile devices suitable for use in practicing various exemplary embodiments.

FIG. 9 shows a diagram of two exemplary mobile devices where phone A 1000 is the master and phone B 1002 is a slave. The audio driver 1004 of phone A may provide a signal 1006 for the transmission to phone B via the induction coupling 46, and a signal 1008 for its own IHF speaker 1010 to generate acoustic sound 1011. The audio drive 1004, or other circuitry, may be configured to buffer the signal 1008 to delay its transmission to the speaker 1010 versus transmission of the signal 1006 to the coil 1012. Phone B may receive information via the induction coupling 46 at its coil 1014, and send the information to its audio driver 1016 for example. The audio driver 1016 may then send an output signal 1018 to its speaker 1020 to generate the acoustic sound 1022. The two sounds 1011 and 1022 may combine, such as to provide an increase loudness for example. The microphone of phone A may be used at the beginning of the pairing, to "hear" the test signal sent to Phone B' IHF and determine the time delay between both IHFs. For psychoacoustic reasons, the delay time between multiple devices producing audio signals may be very important. When sharing audio data, the devices may make sure that any such delays can be controlled in order to avoid any side effect which would compromise audio quality and perception.

Figure 10:
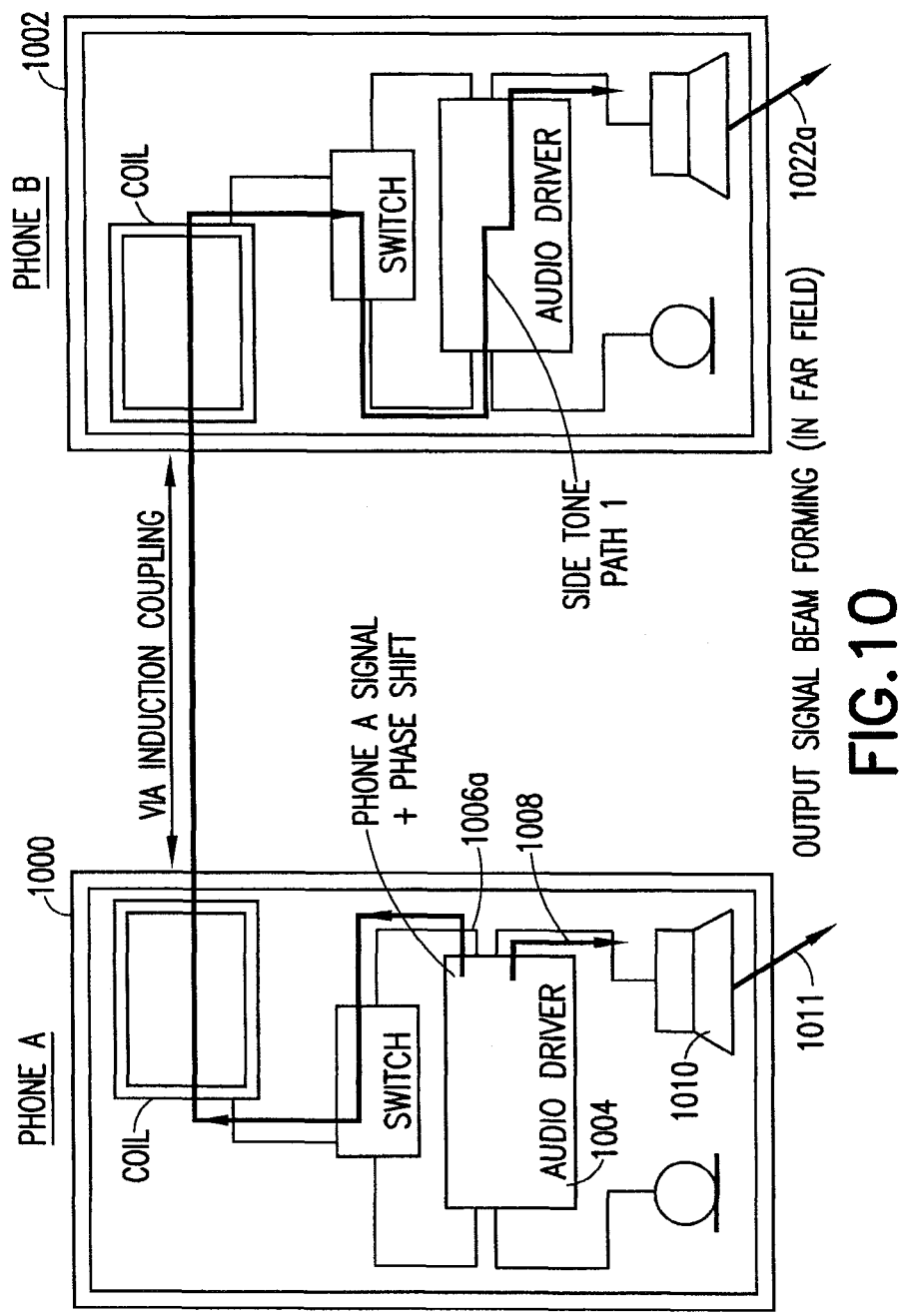
FIG. 10 shows a further drawing of two exemplary mobile devices suitable for use in practicing various exemplary embodiments.

FIG. 10 shows a further diagram of the two exemplary mobile devices 1000, 1002 similar to that shown in FIG. 10. However, in this example phone A 1000 is configured to produce a phase shift to the signal 1006 resulting in signal 1006a which, when played on phone B, provides beamforming for the acoustic output 1011, 1022a of both phones and/or a perceived loudness increase.

The User Interface (UI) may be provided independently, or may be an option within a music player application for example (e.g., a 'share' button). In one non-limiting example, when 'share' is selected on phone A, the phone sends a signal to phone B. Then phone B displays a message/prompt on a display asking user permission. When authorized, both phones may complete the pairing. Alternatively, the sharing option may be constantly active. For example, either phone A, phone B or both may be set to share as soon as coupling occurs between the two devices.

Figure 11:
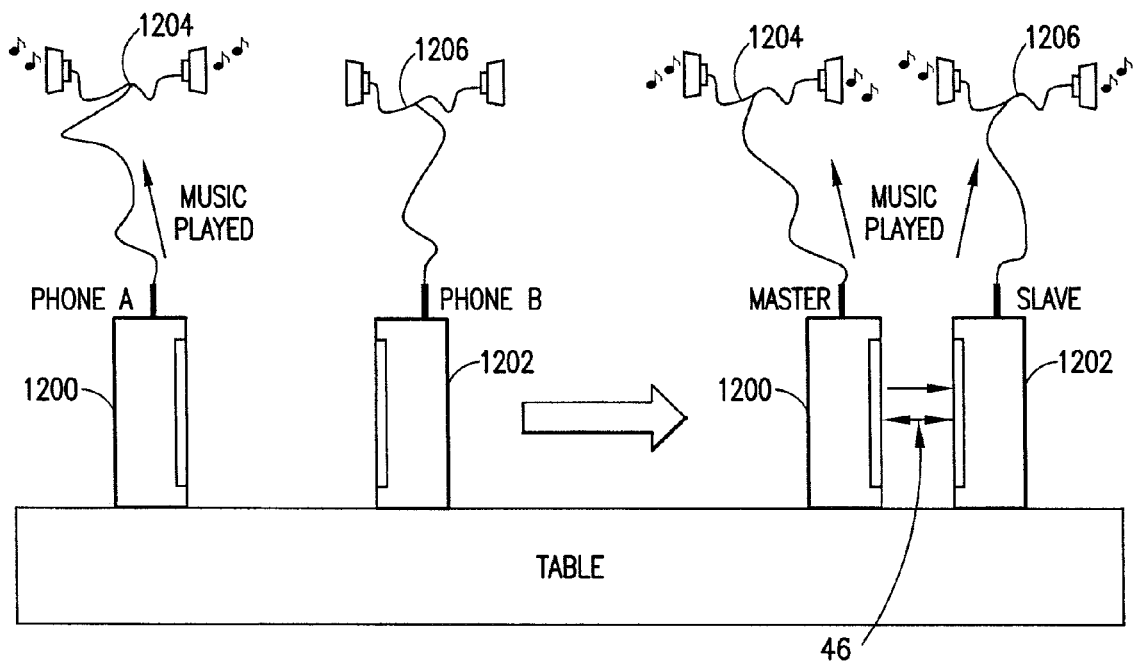
FIG. 11 demonstrates a further induction coupling with two mobile devices in accordance with various exemplary embodiments.

Rather than acoustic coupling via two of more speakers, an alternative example may provide sound generation with use of one or more headsets connected to separate terminal devices to provide a music sharing experience without acoustic coupling. FIG. 11 demonstrates a further induction coupling. As shown, phone A 1200 (when not inductively coupled to phone B 1202) can play audio (e.g., music) through headphones 1204. The headphones 1204 are a separate, distinct device from phone A 1200. The headphones 1204 are plugged into a jack of phone A 1200 and, thus, receive an electrical signal 1008 from the audio driver 1004 (see FIGS. 9 and 10) rather than the electrical signal 1008 being sent to the speaker 1010. Since phone B 1202 is not inductively coupled, no audio is produced on the headphones 1206 connected to phone B. Once phone A and phone B are inductively coupled [for example, because they are close enough to each other so the signal from coil A is received by coil B] via induction 46 (e.g., after pairing), the inductive coupling 46 may be used to provide music data from phone A 1200 (acting as a master) to phone B 1202 (acting as a slave) so that the audio may simultaneously be played on both headphones 1204, 1206. Thus, the user of phone A can simultaneously listen to music with the user of phone B via their individual headphones. Phone B may amplify the received signal, for example, to compensate for transmission losses (e.g., due to physical misalignment, distance between phone A and phone B, etc.).

The first device 1000 or 1200 may "output" from the first device either sound energy (acoustic output) 1011 from the speaker 1010 or an electrical signal to the headset 1204 (such as signal 1008). This is done at about a same time the information from the coil 1012 is sent by inductive coupling to the second device 1002 or 1202. In one type of alternative example, such as when the information being transmitted to the second device is a file (such as a music file or audio file), the output 1011 and/or 1008 from the first device is not necessary to be done at the same time as the induction coupling information transfer. The handshake method described above may be enough when sharing files via headsets for example (i.e. no time delay calculation needed).

In both example situations described above (speaker versus headset), in most situations the system technically generates 'acoustic sound' (i.e. handsfree speaker generates acoustic output based on the audio signal provided to the transducer where the transducer converts audio (electrical) signal into sound energy (acoustic output), and a transducer of the headset also generates acoustic output towards the ear canal. An exception would be a headset utilising bone conduction technology (or vibration conduction) in which case the output from the headset is not acoustic output because it is based on vibration/bone conduction.

In one example the first and second devices are configured to produce an acoustic output where the acoustic output is based on the combination of outputs provided from the first and second devices. Such combination which may refer to loudness due to acoustic coupling and/or stereo widening due to a physical separation may occur between speaker outputs of the first and second devices, or it may be that at least one or both devices are connected to external speakers (i.e. wired or wireless connections) so that acoustic output is partially/completely generated from external speakers. If speakers are closely positioned to each other, loudness increases. If a physical separation is achieved between the speaker outputs, a stereo widening may be improved. Based on the foregoing it should be apparent that the exemplary embodiments provide a method, apparatus and computer program(s) to use inductive coupling to provide coordinated audio sound generation on multiple devices.

Figure 12:
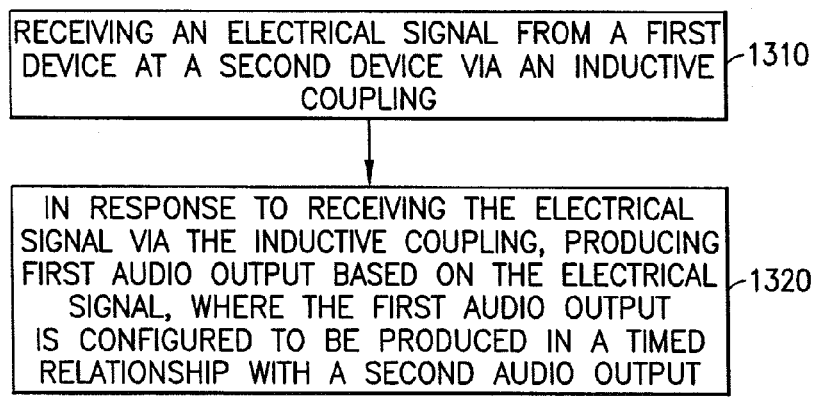
FIG. 12 is a logic flow diagram that illustrates the operation of an exemplary method, and a result of execution of computer program instructions embodied on a computer readable memory, in accordance with various exemplary embodiments.

FIG. 12 is a logic flow diagram that illustrates the operation of a method, and a result of execution of computer program instructions, in accordance with the exemplary embodiments. In accordance with these exemplary embodiments a method performs, at Block 1310, a step of receiving a signal from a first device (e.g., phone A) at a second device (e.g., phone B) via an inductive coupling. At Block 1320, in response to receiving the signal via the inductive coupling, the method performs a step of producing first audio output based on the signal. The first audio output is configured to be produced in a timed relationship with a second audio output. The various blocks shown in FIGS. 3 and 12 may be viewed as method steps, and/or as operations that result from operation of computer program code, and/or as a plurality of coupled logic circuit elements constructed to carry out the associated function(s).

With features as described herein, a method may be provided for using inductive coupling to provide coordinated audio sound generation. The method may include receiving a signal from a first device at a second device via an inductive coupling (such as via an inductive coil for example). The method may also include producing first audio output (e.g., by a speaker) based on the signal. The first audio output may be configured to be produced in a timed relationship with a second audio output. Producing the timed relationship may include, for example, phase shift used for beam forming. The first audio output may be configured to constructively interact with a second audio output. The interaction may modify the perceived loudness via a combination of the first audio output and the second audio output. In any one of the methods noted above, the second audio output may be produced by the first device based on the signal. The phone A may produce the first signal, and the phone B may produce the second signal. The second audio output may be produced by a mobile phone, an external music-desk, a portable music player or a headset device for example. A delay time between the first audio output and the second audio output may be less than 35 ms for example. The inductive coupling may be a first inductive coupling and the signal may be a first signal, where the method may include pairing the second device with a third device via a second inductive coupling and transmitting, to the third device via the second inductive coupling, a second signal based on the first signal. The inductive coupling may be a coupling using an inductive coil, where the inductive coil could be, for example, a near field communication coil, a speaker coil, a metal detection coil and/or a hearing aid compatibility coil, or a dedicated coil for this transmission purpose. The interaction may provide beamforming for a combination of the first audio output and the second audio output. The interaction may generate at least one three dimensional effect for a combination of the first audio output and the second audio output. The at least one three dimensional effect may be stereo widening.

As noted above, producing the output may be performed using an internal speaker and/or a headset speaker. The method may also include storing the first audio signal or file in a memory of the second device. The Phone A may buffer the audio file before playing it in order to respect the time delay between the two phones. The method may also include determining a timing delay between the first device and the second device, and producing the first audio output based at least in part on the timing delay. The timed relationship may be substantially synchronized and/or offset by a predetermined (or calculated) delay. The method may also include converting the signal into an intermediate signal configured to be used to produce the audio output. The intermediate signal may be a demodulated form of the signal and/or a time decompressed form of the signal. The signal from phone A may be modulated inside phone A before being transferred to phone B via the inductive coupling. Once in phone B, the signal may again be processed (demodulated for example) and played on the IHF (for example).

The method may further comprise determining a measured signal characteristic of the signal, where the measured signal characteristic may be received power and/or signal-to-noise ratio. The method may further comprise amplifying the signal, where the amplification may be performed in response to a measured signal characteristic (e.g., received power) being below a threshold value.

One type of example method may comprise producing a first audio output from a first device; and producing an electromagnetic field from one or more coils of the first device, where the electromagnetic field is configured for at least partially producing a second audio output from a second device based upon one or more coils of the second device being in the presence of the electromagnetic field from the first device, where the electromagnetic field is configured to provide a relationship between the first and second audio outputs such that:

when the first audio output is a first acoustic sound radiated from the first device, for the first acoustic sound to be configured to acoustically couple with second acoustic sound radiated from the second device which is based upon the second audio output, or when the first audio output is not acoustic sound, for the first audio output to be output from at least the first device for an external accessory (such as a headset for example) of at least one first user.

In another exemplary embodiment, an apparatus is provided for using inductive coupling to provide coordinated audio sound generation on a mobile device. The apparatus may include at least one processor and at least one memory including computer program code. The at least one memory and the computer program code may be configured to, with the at least one processor, cause the apparatus to perform actions including receiving a signal from a first device at a second device via an inductive coupling, and producing first audio output based on the signal, where the first audio output may be configured to be produced in a timed relationship with a second audio output. the apparatus may be configured to produce the first audio output constructively interact with a second audio output, where the interaction may modify the perceived loudness via a combination of the first audio output and the second audio output. The second audio output may be produced by the first device based on the audio signal, and the second audio output may be produced by an external music-desk, a portable music player and/or a headset for example. The apparatus may be configured to provide a delay time between the first audio output and the second audio output of less than 35 ms for example. The inductive coupling may be a first inductive coupling and the signal may be a first signal, where the at least one memory and the computer program code are further configured to cause the apparatus to pair the second device with a third device via a second inductive coupling and to transmit, to the third device via the second inductive coupling, a second signal based on the first signal. The inductive coupling may be a coupling using an inductive coil, where the inductive coil is a near field communication coil, a speaker coil, a metal detection coil and/or a hearing aid compatibility coil for example.

The interaction may be provided using beamforming for a combination of the first audio output and the second audio output. The interaction may generate at least one three dimensional effect for a combination of the first audio output and the second audio output. The at least one three dimensional effect may be stereo widening. Producing the audio output may be performed using an internal speaker and/or a headset speaker. The at least one memory and the computer program code may be further configured to cause the apparatus to store the first audio output in a memory of the second device. The at least one memory and the computer program code may be further configured to cause the apparatus to determine a timing delay between the first device and the second device, where producing the first audio output is based at least in part on the timing delay.

The timed relationship may be substantially synchronized and/or offset by a predetermined delay. The at least one memory and the computer program code may be further configured to cause the apparatus to convert the signal into an intermediate signal configured to be used to produce the audio output. The at least one memory and the computer program code may be further configured to cause the apparatus to determine a measured signal characteristic of the signal, where the measured signal characteristic may be received power and/or signal-to-noise ratio. The at least one memory and the computer program code may be further configured to cause the apparatus to amplify the signal, where amplification may be performed in response to a measured signal characteristic (e.g., received power) being below a threshold value.

The apparatus may be embodied in an integrated circuit.

One type of example method may comprise producing a first audio output 1008, 1011 from a first device 1000; and producing a communication electromagnetic field from a coil 1012 of the first device, where the communication electromagnetic field comprises information for at least partially producing a second audio output 1018, 1022 from a second device, where the information is configured to provide a relationship between the first and second audio outputs such that:

when the first audio output is acoustic sound 1011, for the first audio output to acoustically couple with the second audio output, which is also acoustic sound 1022, or when the first audio output is not acoustic sound (such as electrical signal 1008 being the first audio output rather than acoustic sound 1011), for the first audio output to be output from the first device for a headset 1204 of at least one first user at about a same time the second audio output 1018 is output from the second device for at least one second user, such as to headset 1206 for example.

When the first audio output is acoustic sound, the method may comprise producing the second audio output as acoustic sound 1022 from the second device at least partially based upon the information from the communication electromagnetic field, where the first audio output constructively interacting with the second audio output. The constructive interacting may provide beamforming from a combination of the first audio output and the second audio output. The constructive interacting may generate at least one three dimensional effect from a combination of the first audio output and the second audio output. The at least one three dimensional effect may be stereo widening. The constructive interacting may provide a loudness of a combination of the first audio output and the second audio output which is louder than a loudness of the first audio output from the first device alone. The method may further comprise buffering the first audio output in the first device to provide a delay between the acoustic sound and the second audio output to less than 35 ms. The method may further comprise inductive coupling of the coil of the first device to a coil of the second device, where information sent by the communication electromagnetic field is provided through the inductive coupling. The method may further comprise pairing the first and/or second device with at least one other device via at least one other inductive coupling; and transmitting to the at least one other device, via the at least one other inductive coupling, the information. The method may comprise the coil being a coil of a near field communication (NFC) antenna, a coil of a speaker, a metal detection coil and/or a hearing aid compatibility (HAC) coil, or any over coil (printed for other purposes on a touch display, antenna, etc.). The method may comprise the first audio output being produced by an internal speaker of the first device or being sent as an electrical signal to a headset. The method may further comprise receiving the information by the second device from the communication electromagnetic field and storing at least some of the information received by the second device in a memory of the second device. The method may further comprise determining a timing delay regarding when the first audio output should be produced versus when the second audio output will be produced and buffering a signal corresponding to the first audio output in the first device to delay producing the first audio output based, at least partially, on the timing delay. The method may further comprise a processor executing a computer program tangibly encoded on a computer readable medium.

One type of example apparatus may comprise a system for generating a first audio output; a coil configured to send information by inductive coupling from the apparatus by a communication electromagnetic field, where the information relates to the first audio output; and a controller connected to the system for generating the audio output and connected to the coil such that:

when the first audio output is acoustic sound, the acoustic sound is generated with a time delay relative to sending of the information from the coil to allow the acoustic sound to acoustically couple with acoustic sound from at least one second device, where the acoustic sound from the at least one second device is generation dependent upon the information from the coil, or when the first audio output is not acoustic sound, for the first audio output to be output from the first device for a headset of at least one first user.

The apparatus may comprise means for buffering an audio signal used to generated the acoustic sound to thereby produce the time delay. The apparatus may further comprises means for determining if the coil is inductively coupled to another coil, and performing a predetermined operation if the coil is inductively coupled to the another coil and the first audio output is acoustic sound. The predetermined operation may be buffering an audio signal in the apparatus to produce a time delay in generating the acoustic sound from the apparatus.

An example method may comprise producing acoustic sound from a first device based, at least partially, upon an audio signal; producing an induction communication electromagnetic field from a coil of the first device, where the induction communication electromagnetic field comprises information relating to the audio signal; and buffering the audio signal in the first device before producing the acoustic sound to at least partially allow coordination between the producing of the acoustic sound and acoustic sound from at least one second device which is at least partially dependent upon the information from the coil.

The method may further comprise producing the acoustic sound from the second device at least partially based upon the information from the coil. The method may further comprise detecting a test signal from the second device and, in response to detecting the test signal, the first device performing a handshake with the second device through inductive coupling with the coil. The method may comprise modulating an intermediate signal to generate the induction communication electromagnetic field.

In one example a non-transitory program storage device readable by a machine may be provided, tangibly embodying a program of instructions executable by the machine for performing operations, the operations comprising producing an audio signal in a first device; producing an induction communication electromagnetic field from a coil of the first device, where the induction communication electromagnetic field comprises information relating to the audio signal; and either:

outputting the audio signal to a transducer of a headset connected to the first device, or buffering the audio signal in the first device for a predetermined period of time before sending the audio output signal to a speaker of the first device to produce acoustic sound.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The apparatus may comprise means for buffering an audio signal used to generate the acoustic sound to thereby produce the time delay. The apparatus may further comprise means for determining if the coil is inductively coupled to another coil, and performing a predetermined operation if the coil is inductively coupled to the another coil and the first audio output is acoustic sound. The apparatus may be provided where the predetermined operation is buffering an audio signal in the apparatus to produce a time delay in generating the acoustic sound from the apparatus.

Additionally in some embodiments sound may be generated by the speaker outputs i.e. no privacy. If said outputs are not synchronized in time, then some undesired echo sound may become evident. Some audio output can be considered for privacy i.e. headset use in which case there is no acoustic coupling or stereo widening between said outputs of the first and second devices.

Technical effects by the proposed solution this invention introduces are different comparing to HAC. In HAC, the acoustic signal is generated in close region of user's ear. Therefore, it could be considered near field communication where the HAC coil must be positioned in close proximity to the hearing aid in a user's ear, whereas the coils in the various embodiments of the invention are positioned relative to device positions regardless where the user's ear is located. In HAC, such audio signal is not shared/audible between multiple users. Therefore, no loudness, no stereo widening targeted suitable for general listening, and generally no far-field sound generation is possible. Various exemplary embodiments relate to entertainment audio which aims playing back an audio signal from at least two separate devices and effectively at least two separate portable devices.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   producing a first audio output from a first device; and
   producing an electromagnetic field from one or more coils of the first device, where the electromagnetic field is configured for at least partially producing a second audio output from a second device based upon one or more coils of the second device being in the presence of the electromagnetic field from the first device, and inductive coupling the one or more coils of the first device to the one or more coils of the second device, where information sent by the electromagnetic field is provided through the inductive coupling, where the information at least partially comprises an audio signal, where the electromagnetic field is configured to provide a relationship between the first and second audio outputs such that:
  when the first audio output is a first acoustic sound radiated from the first device, for the first acoustic sound to be configured to acoustically couple with second acoustic sound radiated from the second device which is based upon the second audio output, and
  when the first audio output is not acoustic sound, for the first audio output to be output from at least the first device for an external accessory of at least one first user,
 when the first audio output is the first acoustic sound, producing the second audio output as the second acoustic sound from the second device at least partially based upon the information from the electromagnetic field, where the first acoustic sound constructively interacting with the second acoustic sound, where the constructive interacting provides a loudness from a combination of the first acoustic sound and the second acoustic sound which is louder than a loudness of the first acoustic sound from the first device alone, and buffering the first audio output in the first device to provide a delay between the first acoustic sound and the second acoustic sound.

2. The method of claim 1 where the constructive interacting provides beamforming from a combination of the first acoustic sound and the second acoustic sound.

3. The method of claim 1 where the constructive interacting generates at least one three dimensional effect from a combination of the first acoustic sound and the second acoustic sound.

4. The method of claim 3 where the at least one three dimensional effect is stereo widening.

5. The method of claim 1 where buffering the first audio output in the first device to provide the delay between the first acoustic sound and the second acoustic sound is for about 35 ms or less.

6. The method of claim 1 further comprising the second device producing a second audio output based, at least partially, upon the inductive coupling.

7. The method of claim 1 further comprising the first audio output from the first device and/or second audio output from the second device occurring, at least partially, based upon the inductive coupling.

8. The method of claim 1 further comprising:
  pairing the first and/or second device with at least one other device via at least one other inductive coupling; and
  transmitting to the at least one other device, via the at least one other inductive coupling, the information.

9. The method of claim 1, where the one or more coils of the first device is a near field communication (NFC) antenna, a coil of a speaker, a metal detection coil and/or a hearing aid compatibility (HAC) coil.

10. The method of claim 1 where producing the first audio output comprises the first audio output being produced by an internal speaker of the first device or being sent as an electrical signal to a headset.

11. The method of claim 1 further comprising receiving information by the second device from the electromagnetic field and storing at least some of the information received by the second device in a memory of the second device.

12. The method of claim 1 further comprising determining a timing delay regarding when the first audio output should be produced versus when the second audio output will be produced and buffering a signal corresponding to the first audio output in the first device to delay producing the first audio output based, at least partially, on the timing delay.

13. The method of claim 1 where the method comprises a processor executing a computer program tangibly encoded on a computer readable medium.

14. The method of claim 1 where the first audio output is output from the first device at about a same time the second audio output is output from the second device.

15. An apparatus comprising:
  a system for generating a first audio output;
  a coil configured to send information by inductive coupling from the apparatus by an electromagnetic field, where the information relates to the first audio output, where the information sent by the inductive coupling comprises at least part of an audio signal; and
  a controller connected to the system for generating the audio output and connected to the coil such that:
    when the first audio output is acoustic sound, the acoustic sound is generated with a time delay relative to sending of the information from the coil to allow the acoustic sound to acoustically couple with acoustic sound from at least one second device, where the acoustic sound from the at least one second device is generation dependent upon the information from the coil, and buffering the audio signal used to generated the acoustic sound to thereby produce the time delay, and
    when the first audio output is not acoustic sound, for the first audio output to be output from the first device for a headset of at least one first user.

16. An apparatus as in claim 15 further comprising means for determining if the coil is inductively coupled to another coil, and performing a predetermined operation if the coil is inductively coupled to the another coil and the first audio output is acoustic sound.

17. An apparatus as in claim 16 where the predetermined operation is buffering the audio signal in the apparatus to produce a time delay in generating the acoustic sound from the apparatus.

18. A method comprising:
  producing acoustic sound from a first device based, at least partially, upon an audio signal;
  producing an induction electromagnetic field from a coil of the first device, where the induction electromagnetic field comprises information relating to the audio signal, where the information comprises at least a portion of the audio signal; and
  buffering the audio signal in the first device before producing the acoustic sound from the first device to at least partially allow coordination between the producing of the acoustic sound from the first device and acoustic sound from at least one second device which is at least partially dependent upon the information from the coil, where the information from the induction electromagnetic field relating to the audio signal and comprising at least a portion of the audio signal is generated by the first device before the acoustic sound is produced by the speaker of the first device.

19. The method of claim 18 further comprising producing the acoustic sound from the second device at least partially based upon the information from the coil.

20. The method of claim 19 further comprising detecting a test signal from the second device and, in response to detecting the test signal, the first device performing a handshake with the second device through inductive coupling with the coil.

21. The method of claim 18 where producing the induction electromagnetic field from the coil comprises modulating an intermediate signal to generate the induction electromagnetic field.

22. A non-transitory program storage device readable by a machine, tangibly embodying a program of instructions executable by the machine for performing operations, the operations comprising:

producing an audio signal in a first device;

producing an induction electromagnetic field from a coil of the first device, where the induction electromagnetic field comprises information relating to the audio signal, where the information comprises at least a part of the audio signal; and selecting between either:

outputting the audio signal to a transducer of a headset connected to the first device, or buffering the audio signal in the first device for a predetermined period of time before sending the audio output signal to a speaker of the first device to produce acoustic sound, where the buffering produces a time delay between producing the information relating to the audio signal, comprising at least a part of the audio signal, by the induction electromagnetic field from the coil of the first device and subsequently producing the acoustic sound at the speaker.

* * * * *